(12) United States Patent
Dange

(10) Patent No.: US 10,552,927 B2
(45) Date of Patent: Feb. 4, 2020

(54) LUGGAGE INFORMATION PROCESSING

(71) Applicant: NCR Corporation, Duluth, GA (US)

(72) Inventor: Afrin Abdulkayyum Dange, Mumbai (IN)

(73) Assignee: NCR Corporation, Atlanta, GA (US)

(*) Notice: Subject to any disclaimer, the term of this patent is extended or adjusted under 35 U.S.C. 154(b) by 560 days.

(21) Appl. No.: 14/963,393

(22) Filed: Dec. 9, 2015

(65) Prior Publication Data
US 2017/0169527 A1 Jun. 15, 2017

(51) Int. Cl.
*G06Q 50/14* (2012.01)
*G06Q 10/08* (2012.01)

(52) U.S. Cl.
CPC .......... *G06Q 50/14* (2013.01); *G06Q 10/087* (2013.01)

(58) Field of Classification Search
CPC .............................. G06Q 50/14; G06Q 10/087
USPC .......................................................... 705/28
See application file for complete search history.

(56) References Cited

U.S. PATENT DOCUMENTS

| | | | | | |
|---|---|---|---|---|---|
| 5,299,116 | A * | 3/1994 | Owens | ................. | G06Q 10/087 235/385 |
| 5,313,052 | A * | 5/1994 | Watanabe | ............... | B64F 1/366 235/375 |
| 5,842,555 | A * | 12/1998 | Gannon | ................. | B64F 1/368 198/358 |
| 5,920,053 | A * | 7/1999 | DeBrouse | ............... | B64F 1/366 235/375 |
| 6,044,353 | A * | 3/2000 | Pugliese, III | ......... | G06Q 10/02 235/375 |
| 6,108,636 | A * | 8/2000 | Yap | ........................ | A45C 13/42 705/5 |
| 6,158,658 | A * | 12/2000 | Barclay | ................... | B64F 1/366 235/375 |
| 6,512,964 | B1 * | 1/2003 | Quackenbush | ........ | G06Q 10/02 700/226 |
| 7,310,568 | B2 * | 12/2007 | Mateer | ................... | G06Q 10/02 700/213 |
| 7,535,358 | B2 * | 5/2009 | Crider | .................... | G06Q 10/08 340/545.6 |
| 2001/0052850 | A1 * | 12/2001 | Zimmerman | .......... | G06K 17/00 340/572.1 |
| 2002/0040928 | A1 * | 4/2002 | Jalili | ...................... | G06Q 10/08 235/385 |
| 2002/0134836 | A1 * | 9/2002 | Cash | ..................... | G06Q 10/08 235/385 |
| 2003/0189094 | A1 * | 10/2003 | Trabitz | .................... | B64F 1/368 235/385 |
| 2006/0111123 | A1 * | 5/2006 | Nerat | ................. | G06K 17/0022 455/456.1 |
| 2007/0109127 | A1 * | 5/2007 | Johnson | .................. | B64F 1/368 340/572.1 |

(Continued)

FOREIGN PATENT DOCUMENTS

GB 2463717 A * 3/2010 ............ G08B 21/24

*Primary Examiner* — Ashford S Hayles
(74) *Attorney, Agent, or Firm* — Schwegman, Lundberg & Woessner

(57) ABSTRACT

Luggage is scanned when placed on a luggage conveyor belt. The scanned information reported to a luggage manager. The luggage manager pushes individual customer luggage information directly to one or more of a digital signage or a mobile application of a mobile device operated by the customer.

12 Claims, 4 Drawing Sheets

(56) References Cited

U.S. PATENT DOCUMENTS

| | | | |
|---|---|---|---|
| 2009/0015398 A1* | 1/2009 | Bhogal | A45C 13/18 340/539.13 |
| 2009/0040048 A1* | 2/2009 | Locker | G08B 13/1427 340/572.1 |
| 2009/0091452 A1* | 4/2009 | Himmel | G01V 15/00 340/572.1 |
| 2010/0069047 A1* | 3/2010 | Mehmet | G01V 15/00 455/414.1 |
| 2010/0223245 A1* | 9/2010 | Vermilye | G06Q 10/08 707/706 |
| 2011/0267192 A1* | 11/2011 | Goldman | G06K 19/07 340/568.1 |
| 2013/0040626 A1* | 2/2013 | Morgaine | H04W 4/00 455/418 |
| 2013/0162429 A1* | 6/2013 | Pfuhl | A45C 13/18 340/539.13 |
| 2013/0168443 A1* | 7/2013 | Lin | G06Q 50/28 235/375 |
| 2013/0214909 A1* | 8/2013 | Meijers | H04W 4/029 340/10.5 |
| 2013/0234849 A1* | 9/2013 | Gupta | A45C 13/18 340/539.11 |
| 2013/0241712 A1* | 9/2013 | Motley, III | G06K 19/0717 340/10.51 |
| 2014/0184387 A1* | 7/2014 | Svec | G06Q 10/083 340/8.1 |
| 2014/0210623 A1* | 7/2014 | McGrath | G08B 21/18 340/572.1 |
| 2015/0029024 A1* | 1/2015 | Outwater | G08B 21/18 340/539.13 |
| 2015/0084745 A1* | 3/2015 | Hertz | H04W 4/12 340/10.3 |
| 2016/0227897 A1* | 8/2016 | Jobling | G09F 3/0291 |
| 2016/0379102 A1* | 12/2016 | Ferguson | G06Q 10/08 235/385 |
| 2017/0004384 A1* | 1/2017 | Audo | G06K 9/00 |
| 2017/0004444 A1* | 1/2017 | Krasko | G06Q 10/0833 |

* cited by examiner

LUGGAGE INFORMATION PROCESSING

BACKGROUND

Not many travelers enjoy the airport. Travelers enjoy the speed with which they can reach their destination but do not enjoy a great many inconveniences while traveling through an airport. Some of these inconveniences include: flight or weather-related delays, overbooked flights, a rush to board one's plane so one can find overhead bin space, the cost of air travel, the added fees for other conveniences (aisle seat, checking luggage/baggage), and many other inconveniences.

More and more airlines are permitting customers to check bags for reduced fees or for free based on a customer achieving a specific loyalty status level or the customer's use of a specific credit card when booking the customer's flight. Most travelers would rather check bags/luggage then carry their bags/luggage on board a plane because of the lack of overhead bin space for carryon bags and because of the maddening passenger rush to be the first to board an aircraft for purposes of ensuring overhead bin space.

However, even with airline relaxed requirements for checking luggage many travelers are still a little reluctant to check their bags/luggage. This is largely because waiting on ones checked bags is a mystery to the average traveler. Generally, there is no indication when the traveler's bags will arrive following one's flight at the luggage conveyor belt or when a traveler's specific bags will be available on the luggage conveyer belt after other bags of the traveler have arrived on the conveyor belt. For example, each traveler may have several checked bags and maybe only a few show up on the conveyor belt initially. All this uncertainty as to the status of the traveler's bag and potential wait for all of the traveler's bags to arrive creates a great deal of dissatisfaction and, in some cases, only adds to the anxiety that travelers experience while at the airport.

SUMMARY

In various embodiments, methods and a system for automated luggage information processing are provided.

According to an embodiment, a method for automated luggage information processing is provided. Specifically.

DETAILED DESCRIPTION

Figure 1:
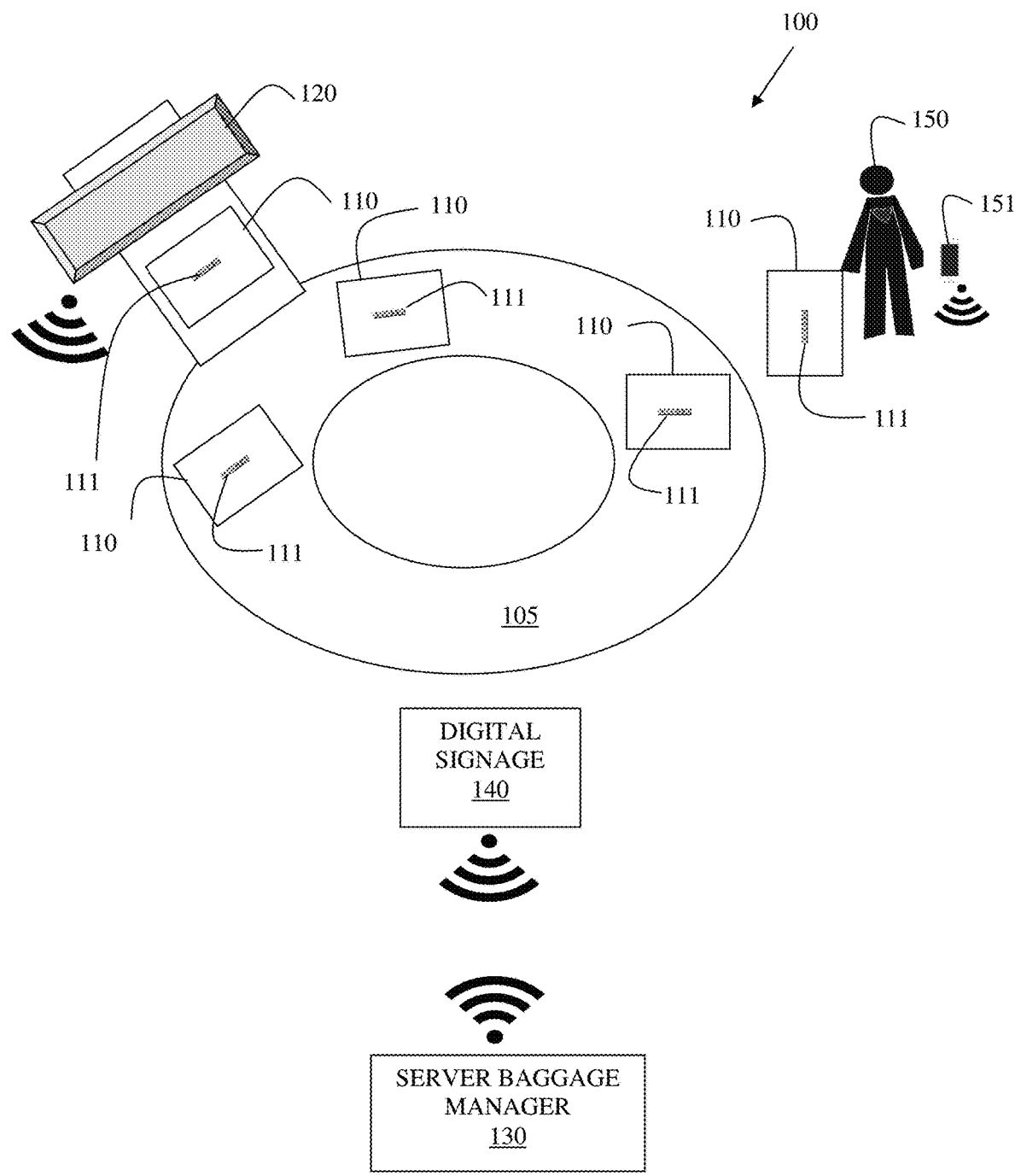
FIG. 1 is a diagram illustrating components of a luggage information processing system, according to an example embodiment.

FIG. 1 is a diagram illustrating components of a luggage information processing system 100, according to an example embodiment. It is to be noted that the luggage information processing system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of automated luggage information processing, presented herein and below.

Furthermore, the techniques and the systems presented herein and below (for automated luggage information processing) may include all or some combination of the components shown with the system 100. The methods are programmed as executable instructions in memory and/or non-transitory computer-readable storage media and executed on one or more processors associated with the components/devices.

Specifically, the system 100 includes a luggage or baggage conveyor belt 105, luggage (bags) 110, each bag 110 including an identifier 111, an identifier scanner 120, a server baggage manager 130, digital signage 140, a traveler 150, and a mobile device 151, such as a phone, tablet, or wearable processing device operated by the traveler.

The identifier scanner 120 is situated at the entrance of the luggage conveyor belt 105 so that as workers unload the luggage 110 from the luggage carts (which were filled with the luggage 110) from the plane being unloaded, the scanner 120 scans the identifiers 111 of the bags 110. The scanner 120 reports each identifier when scanned over a network connection to the server baggage manager 130.

In an embodiment, the network connection between the scanner 120 and the server baggage manager 130 is wireless, wired, or a combination of wired and wireless.

The server baggage manager 130 receives traveler boarding pass information from the airlines over a network connection and perhaps based on the flight manifest. The boarding pass information will identify the customer and the number of checked bags 110 and each checked bag 110 identified by an identifier 111 that is placed on the bags 110 when the customer checked the bags 110 for the flight.

In an embodiment, the identifier 111 is a barcode sticker printed by airline personnel and placed on the bags 110 when the traveler 150 initially checks his/her bags 110. In this embodiment, the scanner 120 is a barcode or Quick Response (QR) code scanner/reader.

In an embodiment, the identifier 111 is a Radio Frequency (RF) tag placed by airline personnel on the bags 110 when the traveler 150 initially checks his/her bags. In this embodiment, the scanner 120 is a RF scanner/reader.

Once the identifiers 111 on the bags 110 pass through the scanner 120 and the scanner reports the identifiers 111 to the server baggage manager 130, the server baggage manner matches to a traveler's boarding pass information and reports over a wired, wireless, or combination of wired and wireless network to digital signage 140.

The digital signage 140 is situated in proximity to the luggage conveyor belt 105 and viewable by the traveler 150 while the traveler 150 is waiting on his/her luggage. The digital signage 140 can identify a passenger along with the total number of checked bags and an indication as to how many of the check bags are presently loaded on the conveyor belt 105. For example, suppose traveler 150 has 3 bags 110 with 2 currently loaded on the conveyor belt 105 and one not yet loaded. The digital signage will present on its display an entry for the traveler's name, total number of check bags 110, and bags 110 presently loaded on the conveyor belt 105.

In still another arrangement, the traveler 150 may operate his/her own mobile device 151 (such as a wearable processing device, a phone, a tablet, etc.) and connect to either the digital signage 140 and/or to the server baggage manager 130. A mobile application processing on the mobile device 151 provides an interface for the traveler to obtain the same baggage information for the traveler that would be presented on the digital signage 140. The connection between the digital signage 140 and the mobile device 151 can be wireless through WiFi or BLUETOOTH™. The connection between the mobile device 151 and the server baggage manager 130 can be wireless through WiFi or through cellular.

In an embodiment, the server baggage manager 130 is situated in a remote cloud processing environment from the baggage conveyor belt 105.

In an embodiment, the server baggage manager 130 is situated on-site and local to the baggage conveyor belt 105.

In an embodiment, if desired by the traveler 150, the traveler 150 can use the mobile device 151 to scan the identifiers 111 of the bags 110 of the traveler when received and the mobile app of the mobile device 151 reports such notification back to the server baggage manager 130. This may provide audit assurance to an airline that a traveler 150 did in fact receive his/her bags 110. To encourage a traveler 150 to participate in this, the airline may offer some incentives or loyalty points to an account of the customer.

Additionally, in an embodiment, metrics in terms of specific flights, times of day, days of week, calendar days, and airlines for luggage delivery and pickup can be historically tracked and then used by airlines to improve performance or to distinguish the airline over other airlines. Airlines may even be able to predict based on a flight to a specific airport on a specific day of the week and at a specific time how long a traveler can expect to wait to retrieve his/her bags 110 following deplaning. This prediction may be provided to the traveler 150 before the traveler decides whether to check luggage 110 and/or provided when obtaining the traveler's boarding pass.

All of this tracking and monitoring makes for improved customer satisfaction and loyalty with airlines by setting realistic traveler expectations. It also can alert travelers if they accidentally pick the wrong bag off the conveyor belt 105. For example, in an embodiment, the scanner 120 can be situated over the conveyor such that the bags and identifiers are continually scanned and reported to the server baggage manager 130, so when a bag 110 is removed from the conveyor belt 105 the digital signage 140 or mobile app of the mobile device 151 may report that the bag 110 was picked up, which would alert the traveler 150 expecting that bag that someone in the area picked the traveler's bag 110 by mistake. Conversely, when the traveler 150 picks a bag 110 off the conveyor belt 105 that is not the traveler's bag 110, then the digital signage 140 and the mobile app of the mobile device 151 will not show the traveler's bag 110 has having been removed from the conveyor belt 105; in which case the traveler can place the bag 110 back on the conveyor belt 105 knowing that it was not the traveler's bag 110. In fact, when bags 110 are continually scanned by the scanner 120 as they travel around the conveyor belt 105 may cause the scanner 120 when it detects a specific bag 120 is no longer on the conveyor belt 105 to send an alert to the server baggage manager 130, which pushes the alert to the mobile device 151 and/or the digital signage 140. This too can inform a traveler 150 when someone else accidentally grabs the traveler's bag 110.

These and other embodiments are now discussed with reference to the FIGS. 2-4.

Figure 2:
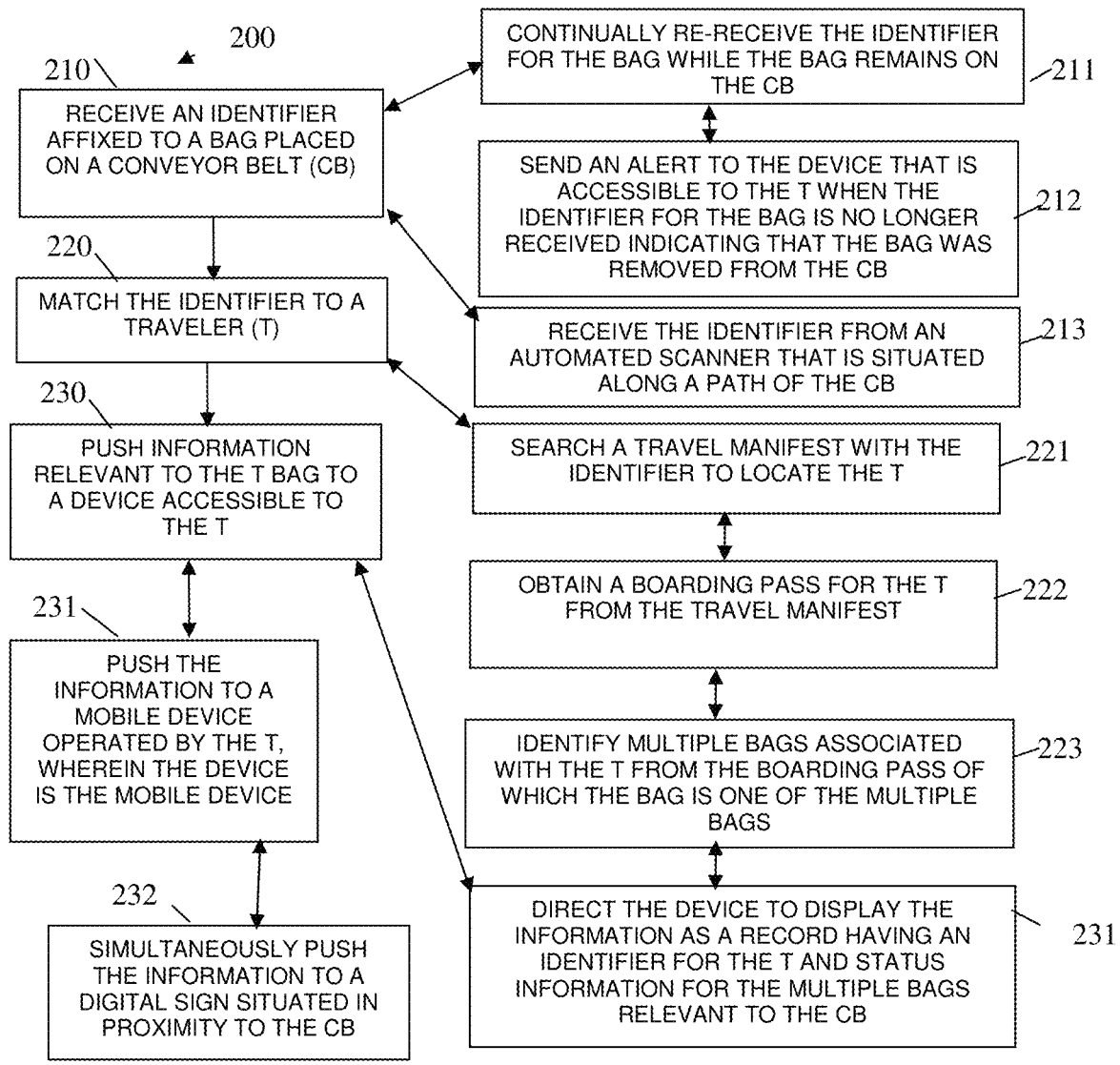
FIG. 2 is a diagram of a method for automated luggage information processing, according to an example embodiment.

FIG. 2 is a diagram of a method 200 for automated luggage information processing, according to an example embodiment. The software module(s) that implements the method 200 is referred to as a "luggage monitor." The luggage monitor is implemented as executable instructions programmed and residing within memory and/or a non-transitory computer-readable (processor-readable) storage medium and executed by one or more processors of a device. The processor(s) of the device that executes the luggage monitor are specifically configured and programmed to process the luggage monitor. The luggage monitor has access to a network during its processing. The network can be wired, wireless, or a combination of wired and wireless.

In an embodiment, the device that executes the luggage monitor is a cloud processing environment.

In an embodiment, the device that executes the luggage monitor is a remote server.

In an embodiment, the device that executes the luggage monitor is a local server that is local to a luggage conveyor belt.

In an embodiment, the luggage monitor is the server baggage manager 130 of the FIG. 1.

At 210, the luggage monitor receives an identifier affixed to a bag placed on a conveyor belt. That is, the identifier is affixed as a tag and the encoded information representing the identifier information is scanned and electronically received by the luggage monitor over a network connection.

According to an embodiment, at 211, the luggage monitor continually re-receives the identifier for the bag while the bag remains on the conveyor belt.

In an embodiment or 211 and at 212, the luggage monitor sends an alert to the device (discussed at 230 below), which is accessible to the traveler when the identifier for the bag is no longer received indicating that the bag was removed from the conveyor belt. This was discussed above with reference to the FIG. 1.

In an embodiment, at 213, the luggage monitor receives the identifier from an automated scanner that is situated along a path of the conveyor belt.

At 220, the luggage monitor matches the identifier to a traveler.

In an embodiment, at 221, the luggage monitor searches a travel manifest with the identifier to locate the traveler. For example, a flight manifest.

According to an embodiment of 221 and at 222, the luggage monitor obtains a boarding pass for the traveler from the travel manifest.

In an embodiment of 222 and at 223, the luggage monitor identifies multiple bags associated with the traveler from the boarding pass of which the bag is one of the multiple bags.

At 230, the luggage monitor pushes information relevant to the traveler bag to a device accessible to the traveler.

According to an embodiment, at 231, the luggage monitor pushes the information to a mobile device operated by the traveler. The device is the mobile device.

In an embodiment of 231 and at 232, the luggage monitor simultaneously push the information to a digital sign situated in proximity to the conveyor belt.

Figure 3:
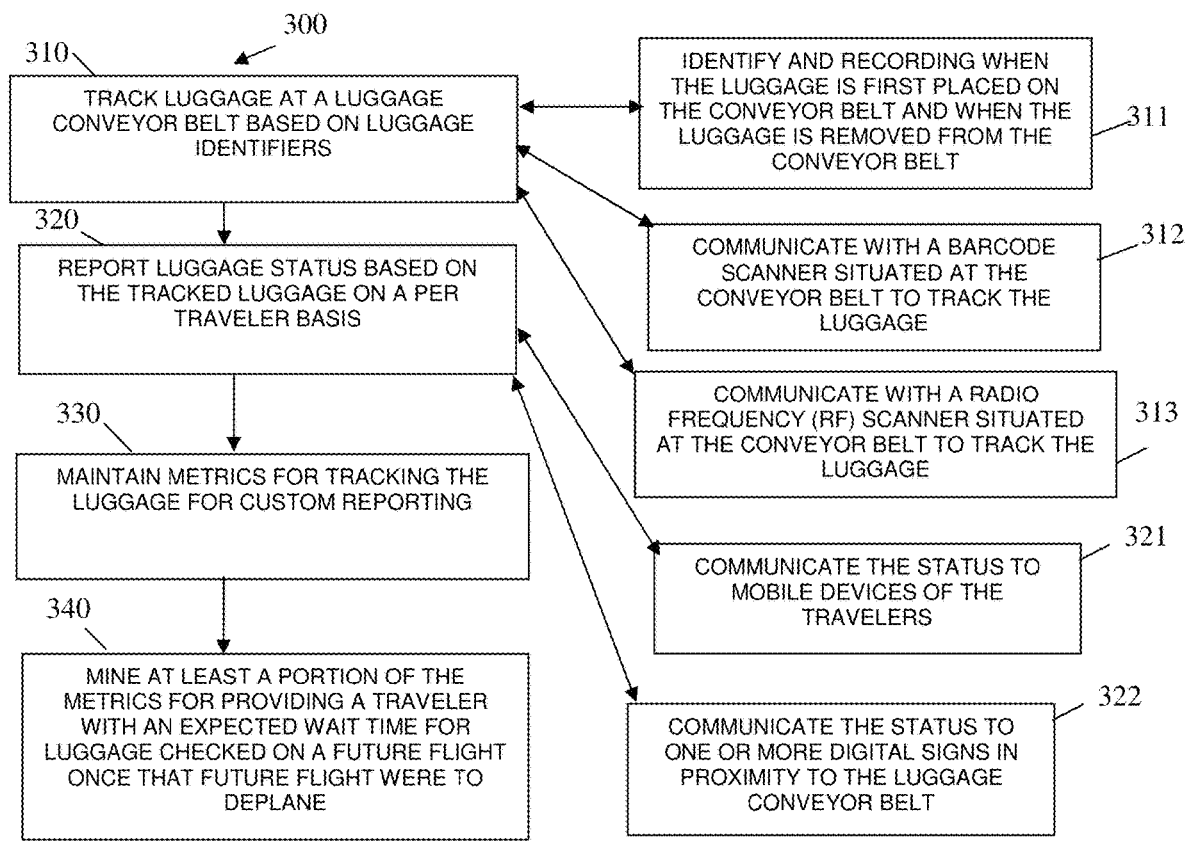
FIG. 3 is a diagram of another method for automated luggage information processing, according to an example embodiment.

FIG. 3 is a diagram of another method 300 for automated luggage information processing, according to an example embodiment. The software module(s) that implements the method 300 is referred to as a "luggage manager." The luggage manager is implemented as executable instructions programmed and residing within memory and/or a non-transitory computer-readable (processor-readable) storage medium and executed by one or more processors of a hardware device. The hardware processors that execute the luggage manager are specifically configured and programmed to process the luggage manager. The luggage manager has access to one or more networks during its processing. Each network can be wired, wireless, or a combination of wired and wireless.

In an embodiment, the luggage manager is the server baggage manager 130 of the FIG. 1.

In an embodiment, the luggage manager is the luggage monitor presented above with the discussion of the FIG. 2.

In an embodiment, the device that executes the luggage manager is a cloud processing environment.

In an embodiment, the device that executes the luggage manager is a remote server.

In an embodiment, the device that executes the luggage manager is a local server that is local to a luggage conveyor.

At 310, the luggage manager tracks luggage at a luggage conveyor belt based on luggage identifiers.

In an embodiment, at 311, the luggage monitor identifies and records when the luggage is first placed on the conveyor belt and is removed from the conveyor belt.

In an embodiment, at 312, the luggage monitor communicates with a barcode scanner situated at the conveyor belt to track the luggage.

In an embodiment at 313, the luggage monitor communicates with a RF scanner situated at the conveyor belt to track the luggage.

At 320, the luggage monitor reports luggage status based on the tracked luggage on a per traveler basis.

In an embodiment, at 321, the luggage monitor communicates the status to mobile devices of the travelers.

In an embodiment, at 322, the luggage monitor communicates the status to one or more digital signs in proximity to the luggage conveyor belt.

At 330, the luggage monitor maintains metrics for tracking the luggage for custom reporting.

According to an embodiment, at 340, the luggage monitor mines at least a portion of the metrics for providing a traveler with an expected wait time for luggage checked on a future light once that future flight were to deplane.

Figure 4:
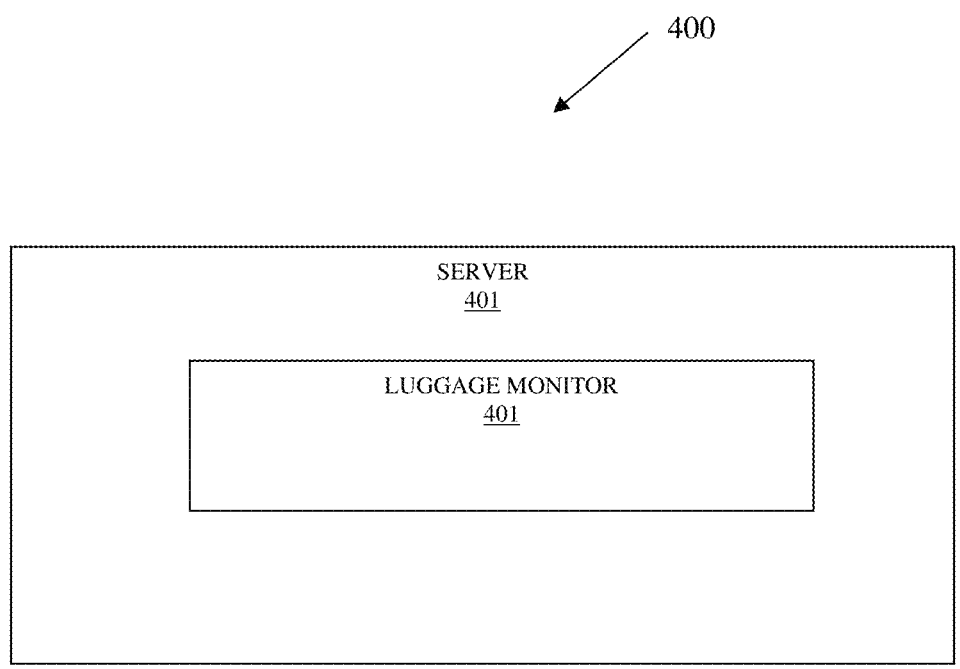
FIG. 4 is a diagram of another luggage information processing system, according to an example embodiment.

FIG. 4 is a diagram of another luggage information processing system 400, according to an example embodiment. Some components of the luggage information processing system 400 are programmed and reside within memory and/or a non-transitory computer-readable medium and execute on one or more processors of the luggage information processing system 400. The luggage information processing system 400 communicates over one or more networks, which can be wired, wireless, or a combination of wired and wireless.

In an embodiment, the luggage information processing system 400 is the system 100 of the FIG. 1.

In an embodiment, the luggage information processing system 400 implements, among other things, the processing discussed in the FIGS. 1-3.

The luggage information processing system 400 includes a server 401 and a luggage monitor 402.

The luggage monitor 402 is configured to: execute on a processor of the server 401, receive luggage information when luggage is placed on a luggage conveyor belt, match the luggage information to traveler information for a traveler, and report the luggage information and traveler information to a device accessible to the traveler.

In an embodiment, the luggage monitor 402 is the server baggage manager 130 of the FIG. 1.

In an embodiment, the luggage monitor 402 is the method 200 of the FIG. 2.

In an embodiment, the luggage monitor 402 is the method 300 of the FIG. 3.

In an embodiment, the device that is accessible to the traveler is a mobile device operated by the traveler. The mobile device is one of: a phone, a tablet, a wearable processing device, and the like.

In an embodiment, the device is a digital sign situated in proximity to the luggage conveyor.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    receiving, by executable instructions that execute on a processor of a server from a non-transitory computer-readable storage medium, an identifier affixed to a bag placed on a conveyor belt while the bag is on the conveyor;
    matching, by the executable instructions, the identifier to a traveler;
    continuously receiving, by the executable instructions, the identifier from a scanner that continuously scans baggage on the conveyor belt as long as the bag remains on the conveyor belt;
    pushing, by the executable instructions, information relevant to the travel bag to a device accessible to the traveler and sending an alert to the device that is accessible to the traveler when the identifier for the bag is no longer being scanned by the scanner when the server is no longer continuously receiving the identifier from the scanner indicating that the bag was removed from the conveyor belt; and
    receiving, by the executable instructions, notification from a mobile-device operated by the traveler when the identifier is scanned by the mobile device indicating that the traveler has taken the bag from the conveyor belt.

2. The method of claim 1, wherein receiving further includes continually re-receiving the identifier for the bag while the bag remains on the conveyor belt.

3. The method of claim 1, wherein receiving further includes receiving the identifier from an automated scanner that is situated along a path of the conveyor belt, wherein the scanner is the automated scanner.

4. The method of claim 1, wherein matching further includes searching a travel manifest with the identifier to locate the traveler.

5. The method of claim 4, wherein searching further includes obtaining a boarding pass for the traveler from the travel manifest.

6. The method of claim 5 further comprising, identifying multiple bags associated with the traveler from the boarding pass of which the bag is one of the multiple bags.

7. The method of claim 6, wherein pushing further includes directing the device to display the information as a record having an identifier for the traveler and status information for the multiple bags relevant to the conveyor belt.

8. The method of claim 1, wherein pushing further includes pushing the information to a mobile device operated by the traveler, wherein the device is the mobile device.

9. The method of claim 8, wherein pushing further includes simultaneously pushing the information to a digital sign situated in proximity to the conveyor belt.

10. A system, comprising:
 a server comprising a processor and a non-transitory computer-readable storage medium having executable instructions representing a luggage monitor;
 a scanner configured to continuously scan luggage identifiers on a luggage conveyor belt and to continuously report the luggage identifiers to the server;
 the luggage monitor when executed by the processor from the non-transitory computer-readable storage medium causes the processor to:
 receive a luggage identifier when luggage is placed on the luggage conveyor belt from the scanner and continuously re-receive the luggage identifier while the luggage remains on the conveyor belt from the scanner;
 match the luggage identifier to traveler information for a traveler;
 report the luggage identifier and traveler information to a device accessible to the traveler, and send an alert to the device that is accessible to the traveler when the luggage identifier is no longer being received from the scanner on the server indicating that the bag was removed from the conveyor belt; and
 receive notification from a mobile device operated by the traveler when the luggage identifier is scanned by the mobile device indicating that the traveler has taken the bag from the conveyor belt.

11. The system of claim 10, wherein the device is a mobile device operated by the traveler.

12. The system of claim 10, wherein the device is a digital sign situated in proximity to the luggage conveyor belt.

* * * * *